T. J. GREENWOOD,

Assignor to himself and T. D. THORNTON.

Boots and Shoes.

No. 7,912. Reissued Oct. 16, 1877.

Witnesses
Ford & R. Smith
Silas W. Moody

Thos J. Greenwood Inventor
By Munday & Evarts his
Attorneys

N. PETERS, PHOTO-LITHOGRAPHER, WASHINGTON, D. C.

UNITED STATES PATENT OFFICE.

THOMAS J. GREENWOOD, OF WARREN, ILLINOIS, ASSIGNOR TO HIMSELF AND THOMAS D. THORNTON.

IMPROVEMENT IN BOOTS AND SHOES.

Specification forming part of Letters Patent No. 190,753, dated May 15, 1877; Reissue No. 7,912, dated October 16, 1877; application filed August 6, 1877.

*To all whom it may concern:*

Figure 1:
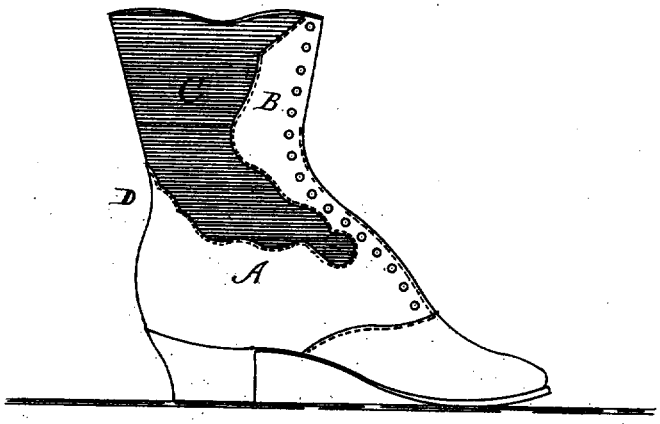
Figure 2:
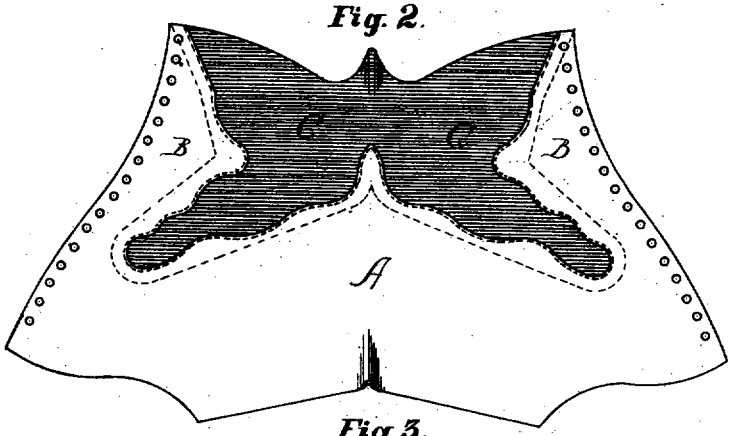
Figure 3:
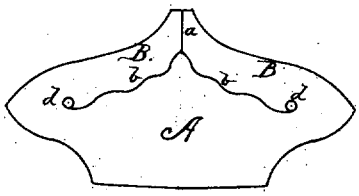

Be it known that I, THOMAS J. GREENWOOD, of Warren, in the county of Jo Daviess and State of Illinois, have invented a new and Improved Shoe, of which the following is a specification:

In the accompanying drawing, Figure 1 represents a side elevation of my improved shoe, Fig. 2, a top view of the quarter and top quarter as spread and connected; and Fig. 3 is a top view of the blank from which the quarter is cut.

Similar letters of reference indicate corresponding parts.

This invention is intended to furnish an improved seamless-back shoe, superior to and cheaper in construction than the common styles, which makes a nice fit, and which is adapted to use in any kind of shoe, and with any kind of vamp. It consists in the formation of the quarters from a single piece or blank of leather, which is partially severed along a center line and symmetrical, curved side lines, to produce front sections, and an upwardly-extending back tongue, the front sections being then spread or sprung forward, and a top quarter or filling corresponding in shape to the cut edges inserted and stitched thereto.

In said drawing, A represents the quarter, and C the top quarter or gore of my improved seamless-back shoe. The quarter A is made from a continuous piece or blank of leather, of the shape shown in Fig. 3, and when embodied in the shoe it forms what are ordinarily known as the "quarters." It is severed by first cutting along the center line *a* from the upper end downward; then preferably in curved wave-lines *b* symmetrically from the center line toward the sides, as shown in Fig. 3.

The cutting of the blank along the lines *a b* produces symmetrical front sections B and a central back tongue, D. These front sections are then sprung apart, and a top quarter or filling, C, corresponding in size and shape to the opening thus made, is inserted and stitched to the edges thereof.

In this manner I produce the curve in the seamless back, so essential to a good fit, without crimping the leather. The circular holes *d* are useful to give greater spread.

The shoe with the seamless back thus produced is capable of use with any style of top quarter or of vamp, is elegant in appearance, conforms to the foot, and is durable and comfortable.

Having thus fully described my invention, I claim as new and desire to secure by Letters Patent—

1. A seamless back made of a quarter, A, having symmetrical front sections B, spread or sprung forward, and a back tongue, D, all of one piece, in connection with a correspondingly-shaped top quarter, C, stitched thereto, substantially in the manner set forth.

2. A quarter for seamless-back shoes cut from a continuous blank, having the lines *a b*, as shown and described, and with holes *d* to form symmetrical front sections that may be spread or sprung out from points near the highest part of the instep, substantially as specified.

3. A quarter for seamless-back shoes cut from a continuous blank, and having the lines *a b*, as shown and described, to form symmetrical front sections, and an upwardly-extending back tongue, adapted to receive the double-pointed gore, substantially as described.

THOMAS J. GREENWOOD.

Witnesses:

EDW. S. EVARTS,

A. B. CROFOOT.